United States Patent [19]
Ito et al.

[11] Patent Number: 5,724,808
[45] Date of Patent: Mar. 10, 1998

[54] AIR-FUEL RATIO CONTROL SYSTEM FOR INTERNAL COMBUSTION ENGINES

[75] Inventors: Hiroshi Ito; Yoshiharu Abe; Tsuyoshi Takizawa; Yoshihisa Hara, all of Wako, Japan

[73] Assignee: Honda Giken Kogyo Kabushiki Kaisha, Tokyo, Japan

[21] Appl. No.: 639,896

[22] Filed: Apr. 26, 1996

[30] Foreign Application Priority Data

Apr. 26, 1995 [JP] Japan .................. 7-125829

[51] Int. Cl.$^6$ ........................... F01N 3/28
[52] U.S. Cl. ................. 60/276; 60/277; 60/278; 60/285
[58] Field of Search ............... 60/274, 276, 277, 60/278, 285, 300, 301

[56] References Cited

U.S. PATENT DOCUMENTS

| | | |
|---|---|---|
| 5,402,641 | 4/1995 | Katoh et al. ............... 60/301 |
| 5,448,886 | 9/1995 | Toyoda ...................... 60/277 |
| 5,473,890 | 12/1995 | Takeshima et al. ......... 60/301 |
| 5,487,269 | 1/1996 | Atanasyan et al. ......... 60/277 |
| 5,528,898 | 6/1996 | Nakayama et al. ......... 60/277 |
| 5,577,382 | 11/1996 | Kihara et al. .............. 60/277 |
| 5,647,204 | 7/1997 | Atanasyan ................. 60/277 |

FOREIGN PATENT DOCUMENTS

5-106493  4/1993  Japan .

*Primary Examiner*—Willis R. Wolfe
*Attorney, Agent, or Firm*—Nikaido, Marmelstein, Murray & Oram LLP

[57] ABSTRACT

An air-fuel ratio control system for an internal combustion engine controls the air-fuel ratio of a mixture supplied to the engine in response to an output from a first air-fuel ratio sensor arranged in an exhaust passage at a location upstream of a catalyst for purifying exhaust gases emitted from the engine. A control parameter for use in controlling an operation of the engine is changed when deterioration of the catalyst caused by sulfur poisoning is detected to desulfurize the catalyst.

13 Claims, 6 Drawing Sheets

AIR-FUEL RATIO CONTROL SYSTEM FOR INTERNAL COMBUSTION ENGINES

BACKGROUND OF THE INVENTION

1. Field of the Invention

This invention relates to an air-fuel ratio control system for internal combustion engines, which controls the air-fuel ratio of a mixture supplied to the engine based on an output from an air-fuel ratio sensor arranged in the exhaust system of the engine at a location upstream of a catalyst arranged in the same.

2. Prior Art

Conventionally, it is well known to control the air-fuel ratio of a mixture supplied to an internal combustion engine by closed loop control (feedback control) responsive to an output from an air-fuel ratio sensor arranged in the exhaust system of the engine or by open loop control, depending on operating regions of the engine.

Further, an air-fuel ratio control system for an internal combustion engine is also known, which employs upstream and downstream air-fuel ratio sensors arranged in the exhaust system of the engine at respective upstream and downstream locations of a catalyst arranged in the same, and controls the air-fuel ratio of a mixture supplied to the engine in a feedback manner responsive to outputs from the air-fuel ratio sensors.

A catalyst deterioration-detecting method has been proposed, e.g. by Japanese Laid-Open Patent Publication (Kokai) No. 5-106493, which is applied to an air-fuel ratio control system of the above-mentioned type and detects deterioration of the catalyst by determining an oxygen storage capacity thereof based on the output from the downstream air-fuel ratio sensor.

In some regions of the world (e.g. the East of the United States), gasoline containing much sulfur (e.g. in an amount of 300 to 800 ppm) is used as fuel for internal combustion engines. A catalyst used in the engine can be poisoned by sulfur contained in the fuel, which decreases the oxygen storage capacity of the catalyst.

However, the proposed method does not provide a countermeasure of desulfurizing the catalyst when it is poisoned by sulfur, so that exhaust emission characteristics of the engine are degraded, i.e. CO, NOx, and other noxious components are emitted in increased amounts due to the decreased oxygen storage capacity of the catalyst. Further, the catalyst can be erroneously determined to be deteriorated due to aging when it is actually poisoned by sulfur.

SUMMARY OF THE INVENTION

It is an object of the invention to provide an air-fuel ratio control system for an internal combustion engine, which is capable of preventing degradation of exhaust emission characteristics of the engine ascribed to suffer poisoning of a catalyst employed in the engine, as well as an erroneous determination that the catalyst is aged when it is poisoned by sulfur.

To attain the above object, the present invention provides an air-fuel ratio control system for an internal combustion engine including an exhaust passage, and a catalyst arranged in the exhaust passage for purifying exhaust gases emitted from the engine, the air-fuel ratio control system including first air-fuel ratio-detecting means arranged at a location upstream of the catalyst for detecting concentration of a particular component of the exhaust gases, and air-fuel ratio control means for controlling an air-fuel ratio of a mixture supplied to the engine in response to an output from the first air-fuel ratio-detecting means.

The air-fuel ratio control system according to the invention is characterized by comprising:

sulfur poisoning-detecting means for detecting deterioration of the catalyst caused by sulfur poisoning; and control parameter-changing means for changing a control parameter for use in controlling an operation of the engine when said deterioration of the catalyst caused by sulfur poisoning is detected.

In one preferred embodiment of the invention, the control parameter is the air-fuel ratio of the mixture supplied to the engine, the control parameter-changing means controlling the air-fuel ratio control means to make the air-fuel ratio of the mixture richer than a stoichiometric air-fuel ratio.

Preferably, the control parameter-changing means controls the air-fuel ratio control means to interrupt air-fuel ratio feedback control responsive to the output from the first air-fuel ratio-detecting means, and make the air-fuel ratio of the mixture supplied to the engine richer than the stoichiometric air-fuel ratio over a predetermined time period, and resume the air-fuel ratio feedback control after lapse of the predetermined time period.

In another preferred embodiment of the invention, the engine includes an intake passage, and exhaust gas-recirculating means for recirculating part of exhaust gases from the exhaust passage to the intake passage, the control parameter being an amount of exhaust gases recirculated by the exhaust gas-recirculating means, the control parameter-changing means controlling the exhaust gas-recirculating means to make the amount of exhaust gases recirculated thereby equal to zero or reduce the same value over a predetermined time period.

Preferably, the control parameter-changing means controls the exhaust gas-recirculating means to restore a normal value of the amount of exhaust gases recirculated thereby after lapse of the predetermined time period.

In a further preferred embodiment of the invention, the engine includes ignition timing control means for controlling ignition timing of the engine, the control parameter being the ignition timing controlled by the ignition timing control means, the control parameter-changing means controlling the ignition timing control means to retard the ignition timing over a predetermined time period.

Preferably, the control parameter-changing means controls the ignition timing control means to restore a normal value of the ignition timing after lapse of the predetermined time period.

In a still further preferred embodiment of the invention, the engine includes an intake passage, and exhaust gas-recirculating means for recirculating part of exhaust gases from the exhaust passage to the intake passage, the control parameter being the air-fuel ratio of the mixture supplied to the engine and an amount of exhaust gases recirculated by the exhaust gas-recirculating means, the control parameter-changing means controlling the air-fuel ratio control means to make the air-fuel ratio of the mixture richer than a stoichiometric air-fuel ratio, and controlling the exhaust gas-recirculating means to make the amount of exhaust gases recirculated thereby equal to zero or reduce the same, over a predetermined time period.

In another preferred embodiment of the invention, the engine includes ignition timing control means for controlling ignition timing of the engine, the control parameter being the air-fuel ratio of the mixture supplied to the engine and the ignition timing controlled by the ignition timing control means, the control parameter-changing means controlling the air-fuel ratio control means to make the air-fuel ratio of the mixture richer than a stoichiometric air-fuel ratio, and controlling the ignition timing control means to retard the ignition timing, over a predetermined time period.

In still another preferred embodiment of the invention, the engine includes an intake passage, exhaust gas-recirculating means for recirculating part of exhaust gases from the exhaust passage to the intake passage, and ignition timing control means for controlling ignition timing thereof, the control parameter being an amount of exhaust gases recirculated by the exhaust gas-recirculating means and the ignition timing controlled by the ignition timing control means, the control parameter-changing means controlling the exhaust gas-recirculating means to make the amount of exhaust gases recirculated thereby equal to zero or reduce the same, and controlling the ignition timing control means to retard the ignition timing, over a predetermined time period.

In a further preferred embodiment of the invention, the engine includes an intake passage, exhaust gas-recirculating means for recirculating part of exhaust gases from the exhaust passage to the intake passage, and ignition timing control means for controlling ignition timing of the engine, the control parameter being the air-fuel ratio of the mixture supplied to the engine, an amount of exhaust gases recirculated by the exhaust gas-recirculating means, and the ignition timing controlled by the ignition timing control means, the control parameter-changing means controlling the air-fuel ratio control means to make the air-fuel ratio of the mixture richer than a stoichiometric air-fuel ratio, controlling the exhaust gas-recirculating means to make the amount of exhaust gases recirculated thereby equal to zero or reduce the same, and controlling the ignition timing control means to retard the ignition timing, over a predetermined time period.

Preferably, the air-fuel ratio control system includes aging deterioration-detecting means for detecting deterioration of the catalyst caused by aging, and wherein when the poisoning-detecting means detects the deterioration of the catalyst caused by sulfur poisoning, the control parameter-changing means changes the control parameter over a predetermined time period to desulfurize the catalyst, and permits the aging deterioration-detecting means to detect the deterioration of the catalyst caused by aging after lapse of the deterioration time period.

Preferably, the air-fuel ratio control system induces a second air-fuel ratio-detecting means arranged at a location downstream of the catalyst, and the poisoning-detecting means determines that the catalyst is poisoned by sulfur when a rich-side maximum value of an output form the second air-fuel ratio control means is below a predetermined value.

The above and other objects, features, and advantages of the invention will become more apparent from the following detailed description taken in conjunction with the accompanying drawings.

DETAILED DESCRIPTION

The invention will now be described in detail with reference to the drawings showing embodiments thereof.

Figure 1:
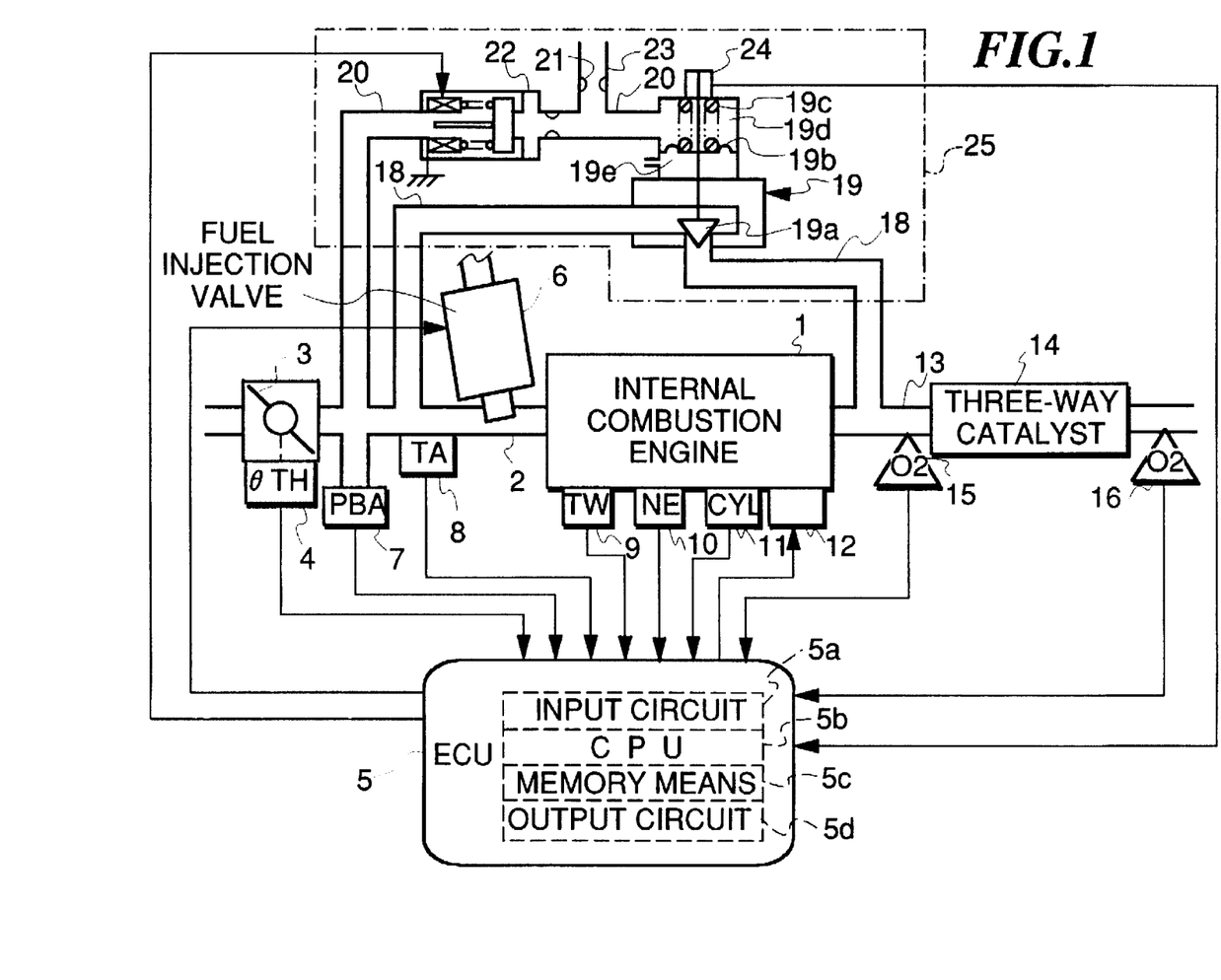
FIG. 1 is a block diagram showing the whole arrangement of an internal combustion engine incorporating an air-fuel ratio control system according to a first embodiment of the invention.

Referring first to FIG. 1, there is shown the whole arrangement of an internal combustion engine (hereinafter simply referred to as "the engine"), which is equipped with an exhaust gas recirculation system, and an air-fuel ratio control system therefor according to a first embodiment of the invention. In the figure, reference numeral 1 designates an internal combustion engine for automotive vehicles, which is a four-cylinder, for example. Connected to the cylinder block of the engine is an intake pipe 2 in which is arranged a throttle valve 3. A throttle valve opening (θTH) sensor 4 is connected to the throttle valve 3, for generating an electric signal indicative of the sensed throttle valve opening θTH and supplying the same to an electronic control unit (hereinafter referred to as "the ECU") 5.

Fuel injection valves 6, only one of which is shown, are inserted into the intake pipe 2 at locations intermediate between the cylinder block of the engine 1 and the throttle valve 3 and slightly upstream of respective corresponding intake valves, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 7 is provided in communication with the interior of the intake pipe 2 at a location immediately downstream of the throttle valve 3, for supplying an electric signal indicative of the sensed absolute pressure PBA within the intake pipe 2 to the ECU 5. An intake air temperature (TA) sensor 8 is inserted into the intake pipe 2 at a location downstream of the intake pipe absolute pressure sensor 7, for supplying an electric signal indicative of the sensed intake air temperature TA to the ECU 5.

An engine coolant temperature (TW) sensor 9, which may be formed of a thermistor or the like, is mounted in the cylinder block of the engine 1, for supplying an electric signal indicative of the sensed engine coolant temperature TW to the ECU 5. An engine rotational speed (NE) sensor 10 and a cylinder-discriminating (CYL) sensor 11 are arranged in facing relation to a camshaft or a crankshaft of the engine 1, neither of which is shown. The engine rotational speed (NE) sensor 10 generates a pulse (hereinafter referred to as "the TDC signal pulse") at a predetermined crank angle position of each cylinder a predetermined angle before a TDC position of the cylinder corresponding to the start of the intake stroke thereof whenever the crankshaft rotates through 180 degrees, while the CYL sensor 11 generates a pulse at a predetermined crank angle position of a particular cylinder of the engine a predetermined angle before a TDC position of the cylinder corresponding to the start of the intake stroke thereof. The TDC signal pulse and the CYL signal pulse are supplied to the ECU 5. Each cylinder of the engine has a spark plug 12 electrically connected to the ECU 5 to have its ignition timing controlled by a control signal therefrom.

A three-way catalyst 14 is arranged within an exhaust pipe 13 connected to the cylinder block of the engine 1, for purifying noxious components such as HC, CO, and NOx. Oxygen concentration sensors (hereinafter referred to as "the upstream O2 sensor" and "the downstream O2 sensor") 15, 16 as air-fuel ratio sensors are mounted in the exhaust pipe 13 at respective upstream and downstream locations of the three-way catalyst 14, for sensing the concentration of oxygen present in exhaust gases emitted from the engine 1 and supplying respective electric signals indicative of the sensed oxygen concentration values to the ECU 5.

Next, exhaust gas recirculation system 25 will be described.

The exhaust gas recirculation system 25 includes an exhaust gas recirculation passage 18 extending between the exhaust pipe 13 and the intake pipe 2 in a fashion bypassing the cylinder block of the engine 1, with an exhaust gas recirculation control valve 19 arranged therein. The exhaust gas recirculation control valve 19, which operates in response to negative pressure, is mainly comprised of a casing 19f, a valve element 19a for opening and closing the passage 18, a diaphragm 19b which divides the interior of the casing 19f into a negative pressure chamber 19d and an atmospheric pressure chamber 19e and is connected to the valve element 19a, the diaphragm 19b being displaceable by negative pressure introduced into the negative pressure chamber 19d by an electromagnetic valve 22 of a normally-closed type, and a spring 19c urging the diaphragm 19b in a valve-closing direction. A communication passage 20 extends between the negative pressure chamber 19d and the intake pipe 2, through which negative pressure within the intake pipe 2 is introduced into the negative pressure chamber 19d via the electromagnetic valve 22. The atmospheric pressure chamber 19e communicates with the atmosphere. Further, an atmospheric pressure-introducing passage 23 is connected to the communication passage 20 at a location downstream of the electromagnetic valve 22, for introducing atmospheric pressure through a restriction 21 provided in the passage 23 into the communication passage 20 and then into the negative pressure chamber 19d. The electromagnetic valve 22 is connected to the ECU 5 to have its operation controlled by a driving signal therefrom to thereby control the amount and speed of lift of the valve element 19a.

The exhaust gas recirculation control valve 19 has a valve lift sensor 24 arranged therein, which detects the position of the valve element 19a and supplies an electric signal indicative of the sensed position of the valve element 19a to the ECU 5.

The ECU 5 determines operating conditions of the engine based on engine operating parameter signals from various sensors mentioned above, and delivers the driving signal to the electromagnetic valve 22 to control the same such that the difference between a valve opening command value LCMD for the exhaust gas recirculation control valve 19 set based on the intake pipe absolute pressure PBA and the engine rotational speed NE and an actual valve opening value LACT of the same detected by the valve lift sensor 24 becomes equal to zero.

The ECU 5 is comprised of an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter referred to as "the CPU") 5b, a memory device 5c storing various operational programs which are executed by the CPU 5b, and for storing results of calculations therefrom, etc., and an output circuit 5d which outputs driving signals to the fuel injection valves 6, the electromagnetic valve 22, etc.

The CPU 5b operates in response to the above-mentioned engine operating parameter signals from various sensors mentioned above to determine various operating conditions in which the engine 1 is operating, such as an air-fuel ratio feedback control region in which the air-fuel ratio of a mixture supplied to the engine 1 is controlled in response to the detected oxygen concentration in the exhaust gases detected by the O2 sensors 15, 16, and open-loop control regions other than the air-fuel ratio feedback control region, and calculates, based upon the determined operating conditions, the valve opening period or fuel injection period TOUT over which the fuel injection valves 6 are to be opened, by the use of the following equation (1), in synchronism with inputting of TDC signal pulses to the ECU 5:

$$TOUT = Ti \times KO2 \times K1 + K2 \tag{1}$$

where Ti represents a basic value of the fuel injection period TOUT, which is determined in accordance with the engine rotational speed NE and the intake pipe absolute pressure PBA. A Ti map for determining the Ti value is stored in the memory device 5c.

KO2 represents an air-fuel ratio feedback control correction coefficient whose value is determined in response to the oxygen concentration in the exhaust gases detected by the O2 sensors 15, 16 such that the air-fuel ratio (oxygen concentration) of exhaust gases detected by the upstream O2 sensor 15 becomes equal to a desired air-fuel ratio during air-fuel ratio feedback control (O2 sensor feedback control), while it is set to respective predetermined appropriate values when the engine is in the open-loop control regions.

K1 and K2 represent other correction coefficients and correction variables, respectively, which are calculated based on various engine operating parameter signals to such values as to optimize characteristics of the engine such as fuel consumption and driveability depending on operating conditions of the engine.

Figure 2:
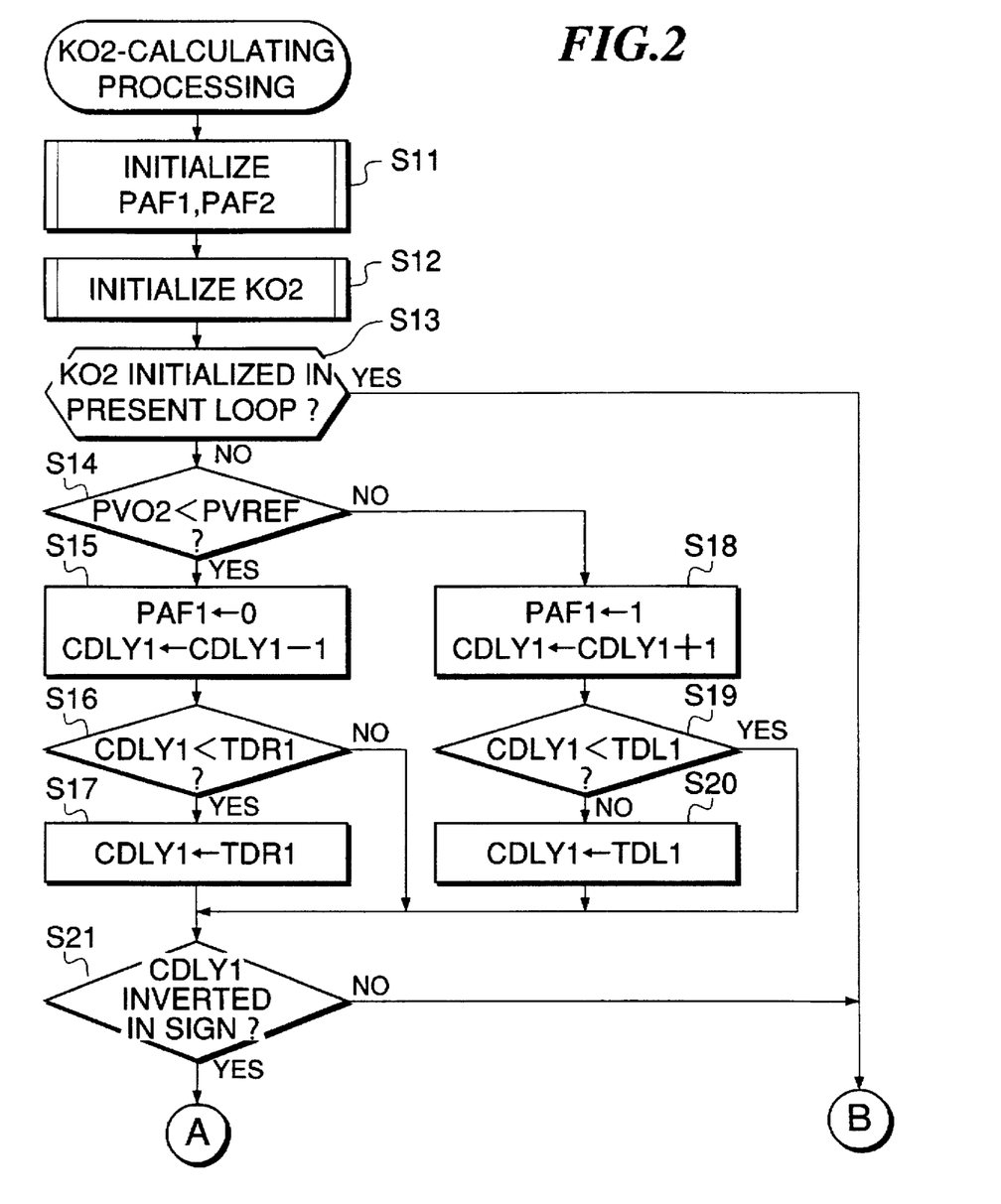
FIG. 2 is a flowchart showing a routine for calculating an air-fuel ratio correction coefficient (KO2)
Figure 3:
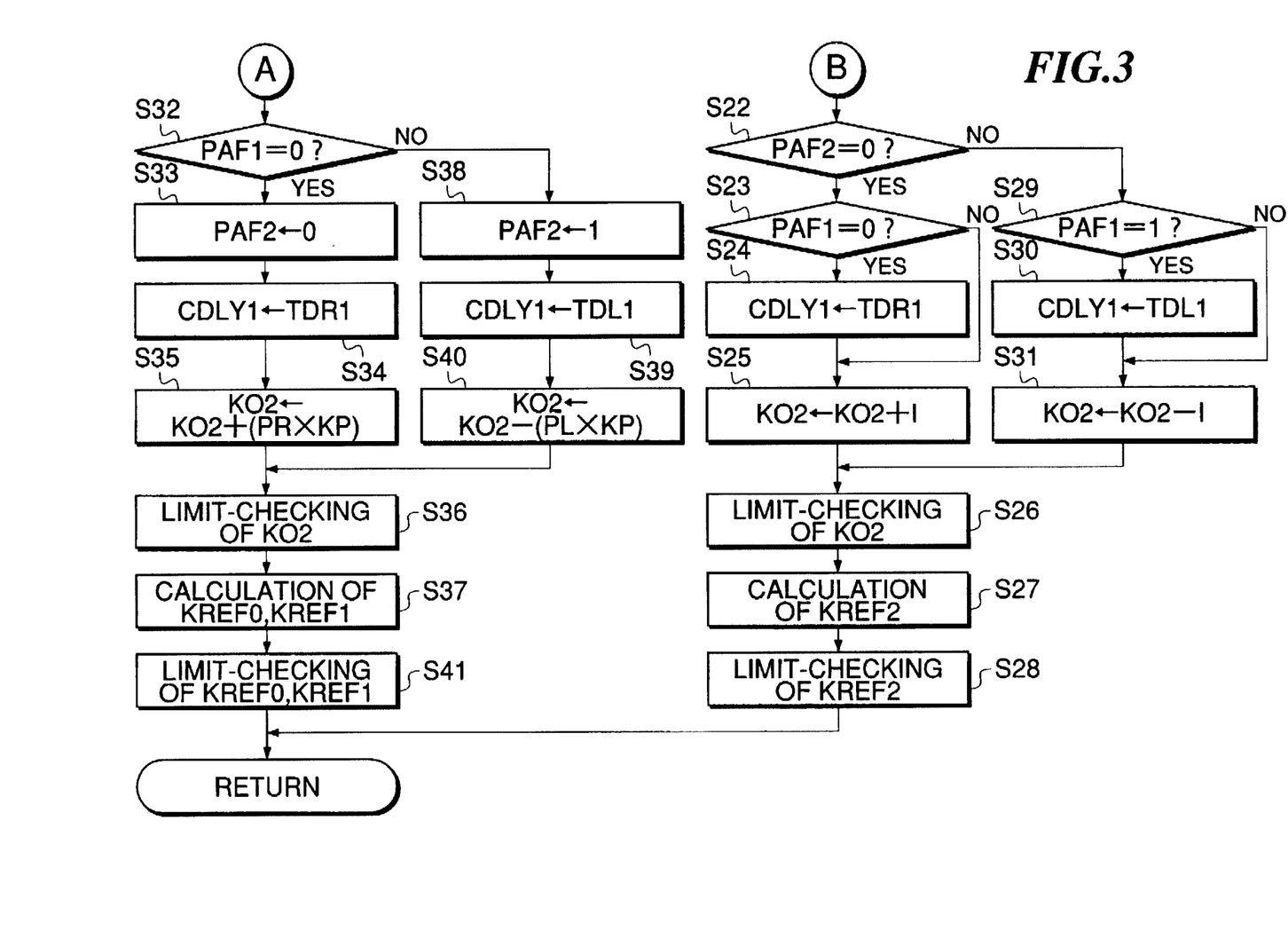
FIG. 3 is a continued part of the FIG. 2 flowchart.

The CPU 5b supplies, through the output circuit 5d, the fuel injection valves 6 with driving signals corresponding to the calculated fuel injection period TOUT determined as above, over which the fuel injection valves 6 are opened, and the electromagnetic valve 22 with the aforementioned driving signal, as well as determines whether the three-way catalyst 14 is poisoned by sulfur and whether the same is deteriorated or aged. FIGS. 2 and 3 show a routine for calculating the air-fuel ratio correction coefficient KO2 during the O2 sensor feedback control. In the present embodiment, the air-fuel ratio correction coefficient KO2 is calculated based on an output (voltage) PVO2 from the upstream O2 sensor 15 and an output (voltage) SVO2 from the downstream O2 sensor 16 such that the air-fuel ratio of a mixture supplied to the engine becomes equal to a stoichiometric air-fuel ratio excess air ratio λ=1).

First, at a step S11, flags PAF1 and PAF2 are initialized. The flag PAF1 indicates, when set to "0" and "1", lean and rich states of the output PVO2 from the upstream O2 sensor 15, respectively, and the flag PAF2 indicates, when set to "0" and "1", lean and rich states of the same assumed after a predetermined delay time has been counted up by a CDLY counter, referred to hereinafter, respectively. Then, at a step S12, the air-fuel ratio correction coefficient KO2 is initialized (i.e. set e.g. to an average value KREF thereof), followed by the program proceeding to a step S13.

At the step S13, it is determined whether or not the air-fuel ratio correction coefficient KO2 has been initialized in the present loop. If the air-fuel ratio correction coefficient KO2 has not been initialized in the present loop, the program proceeds to a step S14, wherein it is determined whether or not the output PVO2 from the upstream O2 sensor 15 is lower than a reference value PVREF (threshold value for determining whether the output PVO2 is rich or lean). If the former is lower than the latter, i.e. if PVO2<PVREP holds, it is determined that the output PVO2 indicates a lean value, and then at a step S15, the flag PAP1 is set to "0", and the count CDLY1 of the CDLY counter for counting a P term-adding/subtracting delay time is decremented by 1. That is, if PVO2<PVREF holds, the flag PAF1 is set to "0" and the count CDLY1 of the CDLY counter is decremented by 1 to update the same whenever the step S15 is executed.

Then, it is determined at a step S16 whether or not the resulting CDLY1 value is smaller than a delay time count value TDR1. If CDLY1<TDR1 holds, the CDLY1 value is set to the delay time count value TDR1 at a step S17.

On the other hand, if PVO2≧PVREF holds at the step S14, which means that the output PVO2 from the upstream O2 sensor 15 indicates a rich value, the program proceeds to a step S18, wherein the flag PAP1 is set to "1" and at the same time the count CDLY1 of the CDLY counter is incremented by 1 to update the same. That is, if PV02≧PVREF holds, the flag PAF1 is set to "1" and the count CDLY1 of the CDLY counter is incremented by 1 to update the same whenever the step S18 is executed.

Then, at a step S19, it is determined whether or not the resulting CLDLY1 value is smaller than a delay time count value TDL1. If CDLY1<TDL1 holds, the CDLY1 value is set to the delay time count value TDL1 at a step S20.

If CDLY1≧TDR1 holds at the step S16, the program skips over the step S17 to a step S21. Similarly, if CDLY1<TDL1 holds at the step S19, the program skips over the step S20 to the step S21.

At the step S21, it is determined whether or not the sign of the count CDLY1 of the CDLY counter has been inverted. That is, it is determined whether or not a delay time period corresponding to the delay time count value TDR1 or TDL1 has elapsed after the output PVO2 from the upstream O2 sensor 15 was inverted with respect to the reference value PVREF. If the delay time period has not elapsed, it is determined at a step S22 in FIG. 3 whether or not the flag PAF2 assumes "0". If the flag PAF2 assumes "0", it is further determined at a step S23 whether or not the flag PAF1 assumes "0". If the flag PAF1 assumes "0", it is determined that the output PVO2 from the upstream O2 sensor 15 has continuously been lean, and then the program proceeds to a step S24, wherein the count CDLY1 of the CDLY counter is set to the delay time count value TDR1, followed by the program proceeding to a step S25. On the other hand, if the flag PAF1 assumes "1" at the step S23, it is determined that the delay time period has not elapsed yet after the output PV02 from the upstream O2 sensor 15 was inverted from a rich side to a lean side with respect to the reference value PVREF, so that the program skips over the step S24 to the step S25.

At the step S25, the air-fuel ratio correction coefficient KO2 is updated by adding an integral term I to the immediately preceding value of the coefficient KO2 by the use of the following equation (2):

$$KO2=KO2+I \tag{2}$$

After execution of the step S25, limit-checking of the resulting KO2 value is executed by a conventional method at a step S26. Then, a value KREF2 (learned value of the correction coefficient KO2 for use in starting of the vehicle) is calculated at a step S27, and then limit-checking of the resulting KREF2 value is carried out by a conventional method at a step S28, followed by terminating the program.

On the other hand, if PAF2 =1 holds at the step S22, it is further determined at a step S29 whether or not the flag PAF1 assumes "1" If PAF1=1 holds, it is determined that the output PVO2 from the upstream O2 sensor 15 has continuously been rich, and then at a step S30, the count CDLY1 of the CDLY counter is set to the delay time count value TDL1, followed by the program proceeding to a step S31. On the other hand, if PAF1=0 holds at the step S29, it is determined that the delay time period has not elapsed after the output PVO2 from the upstream O2 sensor 15 was inverted from the lean side to the rich side, so that the program skips over the step S30 to the step S31.

At the step S31, the correction coefficient KO2 is updated by subtracting the integral term I from the immediately preceding value of the correction coefficient KO2 by the use of the following equation (3):

$$KO2=KO2-I \tag{3}$$

Then, the steps S26 to S28 are executed, followed by terminating the program.

Thus, when the sign of the count CDLY1 of the CDLY counter has not been inverted, the flags PAF1 and PAP2 are checked to determine whether or not the output PVO2 from the upstream O2 sensor 15 was inverted, and depending on the results of the determination, the final value of the air-fuel ratio correction coefficient KO2 is calculated.

On the other hand, if the sign of the count CDLY1 of the CDLY counter has been inverted, which means that a time period corresponding to the delay time count value TDR1 or TDL1 has elapsed after the output PVO2 from the upstream O2 sensor 15 was inverted, the program proceeds to a step S32 in FIG. 3, wherein it is determined whether or not the output PVO2 from the upstream O2 sensor 15 indicates a lean value. If PAF1=0 holds at the step S32, i.e. if the output PVO2 from the upstream O2 sensor 15 indicates a lean value, the program proceeds to a step S33.

At the step S33, the flag PAF2 is set to "0", and then the count CDLY1 of the CDLY counter is set to the delay time count value TDR1, followed by the program proceeding to a step S35.

At the step S35, the correction coefficient KO2 is updated by adding the product of a proportional term PR and a coefficient KP to the immediately preceding value of correction coefficient KO2 by the use of the following equation (4):

$$KO2=KO2+(PR\times KP) \tag{4}$$

where KO2 on the right side represents the immediately preceding value of the air-fuel ratio correction coefficient KO2, PR the proportional term which is a correction term employed for shifting the air-fuel ratio to the rich side by increasing the correction coefficient KO2 in a stepped-up manner when a delay time period corresponding to the count value TDL1 has elapsed after the output PVO2 from the upstream O2 sensor 15 was inverted from the rich side to the lean side, and is varied according to the output SVO2 from the downstream O2 sensor 16 (the manner of calculation thereof will be described hereinafter), and KP the coefficient set according to operating conditions of the engine 1.

Then, limit-checking of the resulting KO2 value is carried out at a step S36, and a value KREF0 (average value of the correction coefficient KO2 for use when the engine is idling) and a value KREF1 (average value of the correction coefficient KO2 for use when the engine is not idling) are calculated at a step S37. Then, the program proceeds to a step S41, wherein limit-checking of the values KREF0 and KREF1 is carried out, followed by terminating the program.

If PAF1=1 holds at the step S32, which means that the output PVO2 from the upstream O2 sensor 16 indicates a rich value, the program proceeds to a step S38, wherein the flag PAF2 is set to "1", and then at a step S39, the count CDLY1 of the CDLY counter is set to the delay time count value TDL1, followed by the program proceeding to a step S40.

At the step S40, the correction coefficient KO2 is updated by subtracting the product of a proportional term PL and the coefficient KP from the immediately preceding value of the correction coefficient KO2 by the use of the following equation (5):

$$KO2=KO2-(PL\times KP) \tag{5}$$

where KO2 on the right side represents the immediately preceding value of the air-fuel ratio correction coefficient KO2, PL the proportional term which is employed for shifting the air-fuel ratio to the lean side by decreasing the correction coefficient KO2 in a stepped-up manner when a time period corresponding to the delay time count value TDR1 has elapsed after the output PVO2 from the upstream O2 sensor 15 was inverted from the lean side to the rich side, and is varied according to the output SVO2 from the downstream O2 sensor 16 (the manner of calculation thereof will be described hereinafter), and KP the aforementioned coefficient.

Then, the steps S36, S37 and S41 are sequentially executed, followed by terminating the program. Thus, the timing of generation of the integral term I and the proportional term PR or PL of the correction coefficient KO2 is calculated based on the output PVO2 from the upstream O2 sensor 15.

Next, the manners of calculation of the correction terms PL and PR will be described.

The correction terms PR and PL are basically calculated in response to the output SV02 from the downstream O2 sensor 16 (i.e. by a secondary feedback control responsive to the downstream O2 sensor 16). However, when the secondary feedback control is inhibited, e.g. when the engine is idling, when the downstream O2 sensor 16 has not been activated, etc., one of predetermined values or one of the learned values calculated during the secondary feedback control is used as the correction terms PR and PL.

When the output SV02 from the downstream O2 sensor 16 is lower than a reference value SVREF (e.g. 0.45V), an addend/subtrahend term DPL to be applied when the output SVO2 is determined to indicate a lean value is added to the PR value and at the same time the addend/subtrahend term DPL is subtracted from the PL value. However, when the resulting PR value becomes larger than an upper limit value PRMAX, the former is set to the latter, whereas when the resulting PL value becomes smaller than a lower limit value PLMIN, the former is set to the latter.

On the other hand, if SVO2≧SVREF holds, an addend/subtrahend term DPR to be applied when the output SVO2 from the downstream O2 sensor 16 is determined to indicate a rich value is subtracted from the PR value and at the same time the addend/subtrahend term DPL is added to the PL value. However, when the resulting PR value becomes smaller than a lower limit value PRMIN, the former is set to the latter, whereas when the resulting PL value becomes larger than a higher limit value PLMAX, the former is set to the latter.

According to this processing, so long as SVO2 SVREF holds, the PR value is increased and the PL value is decreased, while so long as SVO2≧SVREF holds, the PR value is decreased and the PL value is increased.

Figure 4:
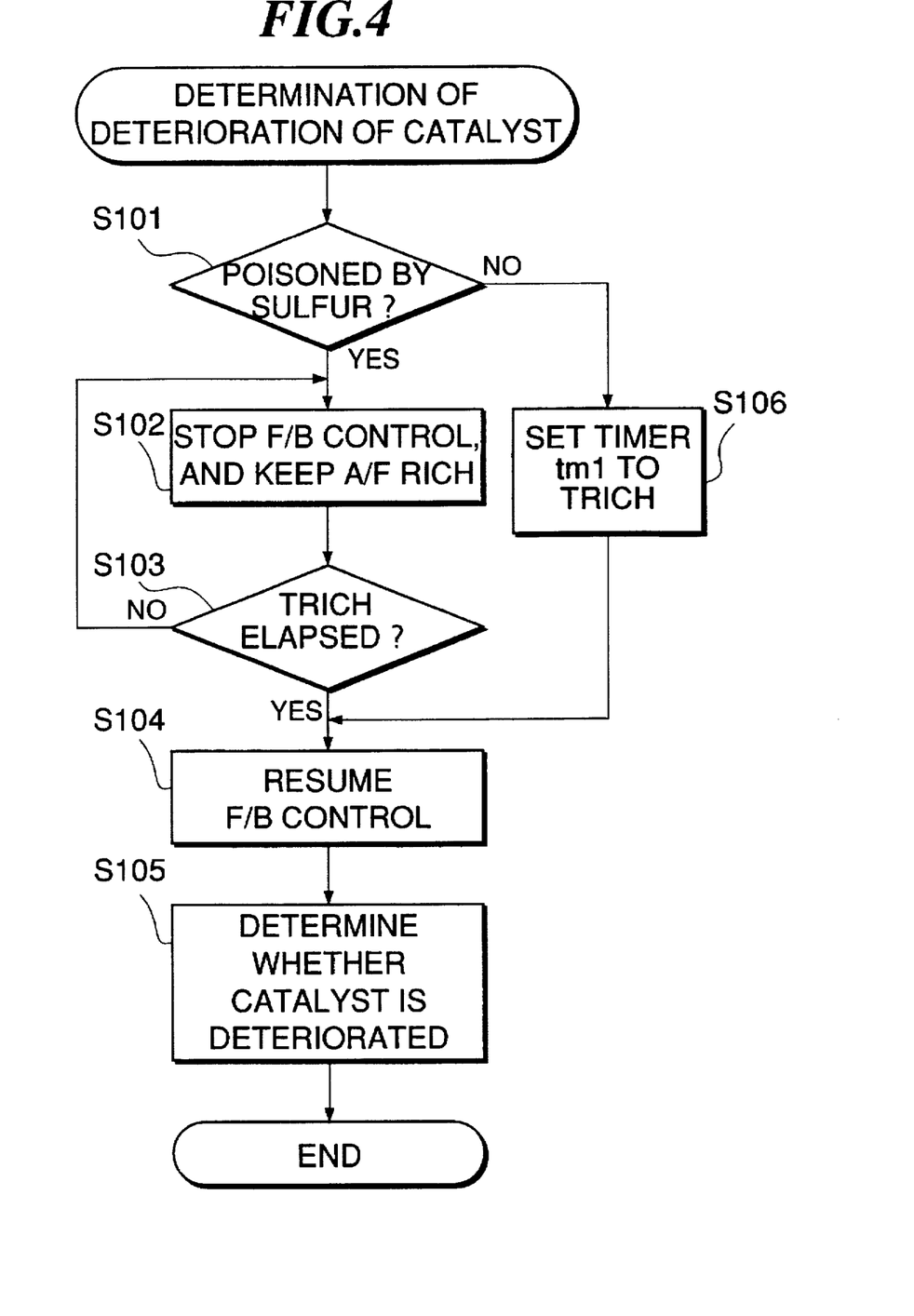
FIG. 4 is a flowchart showing a routine for desulfurizing a catalyst employed in the engine and determining deterioration of the catalyst, according to the first embodiment.

FIG. 4 shows a routine for detecting deterioration of the three-way catalyst 14 according to the present embodiment.

First, at a step S101, it is determined whether or not the three-way catalyst 14 has been detected to be poisoned by sulfur. Whether the three-way catalyst 14 is poisoned or not is determined based on the behavior of the output SVO2 from the downstream O2 sensor 16 in a manner described hereinafter. If the three-way catalyst 14 has been detected not to be poisoned at the step S101, a downcount timer tm1 is set to a predetermined time period TRICH and started at a step S106, and the program proceeds to a step S104. On the other hand, if the three-way catalyst 14 has been detected to be poisoned at the step S101, the program proceeds to a step S102, wherein the air-fuel ratio feedback control is interrupted, and the air-fuel ratio correction coefficient KO2 is changed to such a predetermined value as make the air-fuel ratio of the mixture supplied to the engine richer than the stoichiometric air-fuel ratio. Then, it is determined at a step S103 whether the count of the downcount timer tm1 is equal to zero, i.e. whether or not the predetermined time period TRICH has elapsed. If the predetermined time period TRICH has not elapsed, the program returns to the step S102 to continue the processing of the step S102, thereby keeping the air-fuel ratio of the mixture richer than the stoichiometric air-fuel ratio over the predetermined time period TRICH. This causes the sulfur S within the three-way catalyst 14 to react with hydrogen in the enriched exhaust gases to form hydrogen sulfide $H_2S$, which is emitted as an exhaust gas component.

The amount $\Delta H_2S$ of hydrogen sulfide ($H_2S$) generated from the three-way catalyst 14 by keeping the air-fuel ratio of the mixture supplied to the engine richer than the stoichiometric air-fuel ratio is expressed by the following equation (6):

$$\Delta H_2S=\Delta A/F \times TRICH \times Q \times KS \tag{6}$$

where $\Delta A/F$ represents an amount of change of the air-fuel ratio of the mixture supplied to the engine in an enriching direction with respect to the stoichiometric air-fuel ratio, Q an flow rate of exhaust gases flowing through the three-way catalyst 14, and KS a correction coefficient.

As can be clearly seen from the above, the degree of desulfurization of the three-way catalyst 14 varies with the amount of change $\Delta A/F$ of the air-fuel ratio and the predetermined time period TRICH. Therefore, the amount of change $\Delta A/F$ of the air-fuel ratio and the predetermined time period TRICH are set respectively to a sufficient amount and a sufficient time period to fully effect desulfurization of the three-way catalyst 14. For example, the amount of change $\Delta A/F$ and the predetermined time period TRICH are set such that the excess air ratio λ falls within a range of 0.9 to 0.95.

When it is determined at the step S103 that the predetermined time period TRICH has elapsed, the air-fuel ratio feedback control is resumed at a step S104, and then determination as to deterioration of the three-way catalyst 14 due to aging is executed at a step S105, followed by terminating the program.

The determination at the step S101 of the FIG. 4 routine as to whether the three-way catalyst 14 has been poisoned is executed by the CPU 5b during the air-fuel ratio feedback control described hereinabove with reference to FIGS. 2 and 3.

Figure 5:
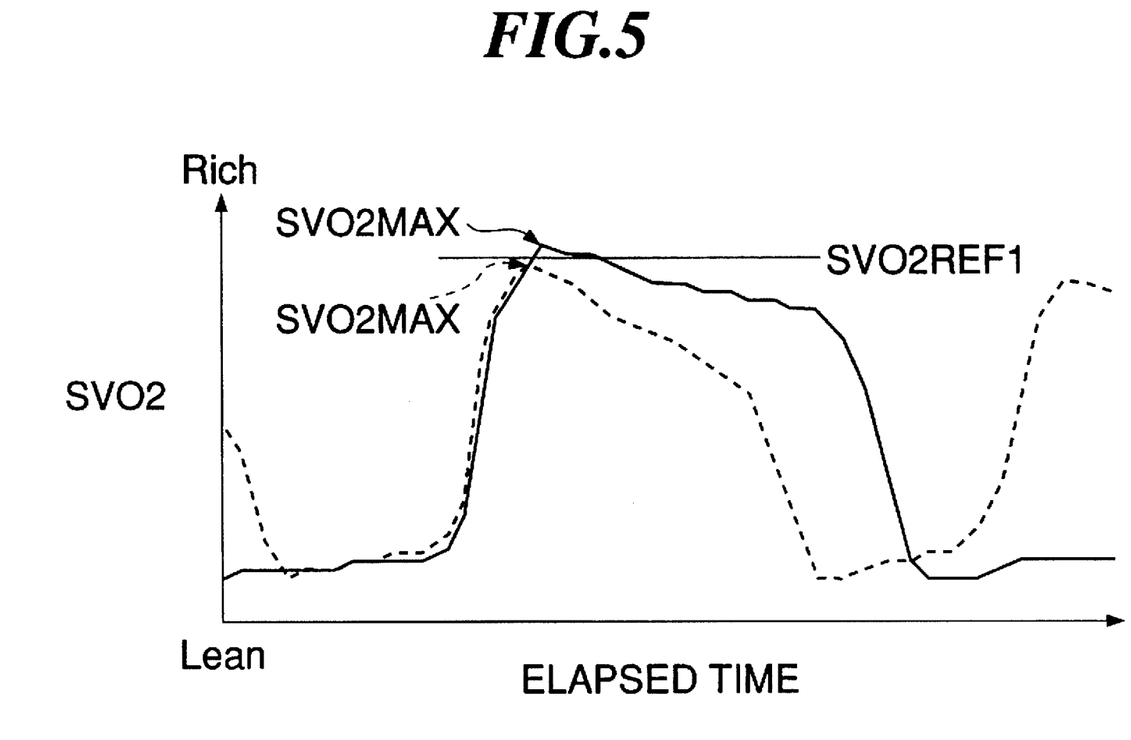
FIG. 5 is a graph showing waveforms of outputs from a normally-operating downstream O2 sensor and a sulfur-poisoned downstream O2 sensor, which is useful in explaining a method of determining sulfur-poisoning of the catalyst.

Now, an example of the method of determination as to whether the three-way catalyst 14 is poisoned by sulfur will be described with reference to FIG. 5, in which the ordinate represents the output SVO2 from downstream O2 sensor 16, and the abscissa represents elapsed time. In the figure, the solid line indicates a sensor output curve obtained when the three-way catalyst is not poisoned by sulfur (e.g. when gasoline containing 0 ppm of sulfur is used), and the broken line indicates a sensor output curve obtained when the three-way catalyst is poisoned by sulfur (e.g. when gasoline containing 1000 ppm of sulfur is used).

The poisoning-determining method employed in the present embodiment is based on the fact that the larger the sulfur content in gasoline, the lower the maximum value (rich-side maximum value) SVO2MAX of the output SVO2 from the downstream O2 sensor 16. Therefore, it is determined whether or not the maximum value SVO2MAX of the output SVO2 from the downstream O2 sensor 16 is equal to or lower than a predetermined value SVO2REF1, i.e. if SVO2MAX≦SVO2REF1 holds, it is determined that the three-way catalyst 14 is poisoned.

The determination at the step S105 as to whether the three-way catalyst 14 is deteriorated due to aging is carried out e.g. by executing a special air-fuel ratio feedback control in which the air-fuel ratio correction coefficient KO2 is calculated based on the output SVO2 from the downstream O2 sensor alone, and determining that the three-way catalyst 14 is deteriorated when an average value of a repetition period of inversion of the output SVO2 from the downstream O2 sensor 16 with respect to a reference value during the special air-fuel ratio feedback control is smaller than a predetermined value.

Thus, according to the present embodiment, when the three-way catalyst 14 is poisoned by sulfur, desulfurization of the three-way catalyst 14 is carried out to a sufficient degree, whereby it is possible to prevent exhaust emission characteristics of the engine from being degraded due to degradation of the oxygen storage capacity of the three-way catalyst 14, caused by sulfur-poisoning of the same. Further, the determination as to deterioration of the three-way catalyst 14 is executed after the three-way catalyst 14 is fully desulfurized, which prevents the three-way catalyst 14 from being erroneously determined to be deteriorated due to aging when the three-way catalyst 14 is poisoned by sulfur, thereby enabling accurate determination of the deterioration of the three-way catalyst 14.

Next, a second embodiment of the present invention will be described. The second embodiment is distinguished from the first embodiment described above only in the manner of desulfurization of the three-way catalyst 14.

Figure 6:
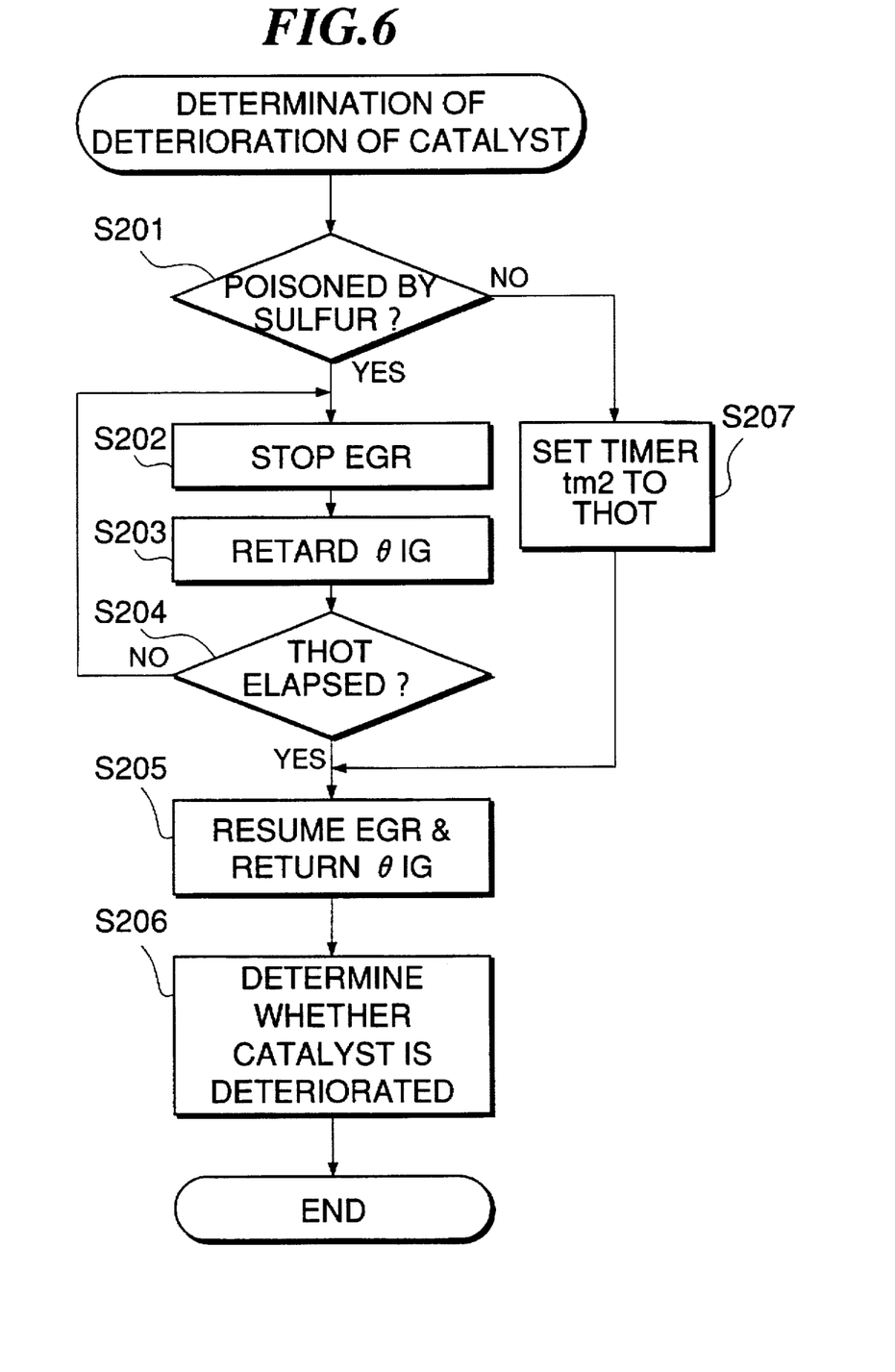
FIG. 6 is a flowchart showing a routine for desulfurizing the catalyst and determining deterioration of the catalyst, according to a second embodiment of the invention.

FIG. 6 shows a routine for determining deterioration of the three-way catalyst 14 according to the present embodiment. In this routine, steps S201 and S206 are identical with the steps S101 and S105 of the FIG. 4 routine described hereinbefore.

First, if it is determined at the step S201 that the three-way catalyst 14 has been detected not to be poisoned by sulfur, a predetermined time period THOT is set to a downcount timer tm2 at a step S207, and the program proceeds to the step S205. if it is determnd. if it is determined at the step S201 that the three-way catalyst 14 has been detected to be poisoned by sulfur, the exhaust gas recirculation control valve 19 is closed to interrupt recirculation of exhaust gases from the exhaust pipe 13 to the intake pipe 2 by the exhaust gas recirculation system 25 at a step S202, and the ignition timing θIG of the engine is retarded by a predetermined amount at a step S203. Then, it is determined at a step S204 whether or not the count of the downcount timer tm2 is equal to "0", i.e. whether or not the predetermined time period THOT has elapsed. If the predetermined time period THOT has not elapsed, the program returns to the step S202 to continue the processing of the steps S202 and S203, whereby the interruption of the exhaust gas recirculation and the retardation of the ignition timing θIG are continued over the predetermined time period THOT.

It is known that the desulfurization of the three-way catalyst 14 is promoted when the temperature of the catalyst 14 is higher than approximately 600° C. The recirculation of exhaust gases to the intake pipe 2, however, causes the temperature of exhaust gases to lower. Therefore, the recirculation of exhaust gases is interrupted to raise the temperature of exhaust gases to thereby promote desulfurization of the three-way catalyst 14 by exhaust gases raised in temperature. Further, the retardation of the ignition timing θIG also causes the temperature of the three-way catalyst 14 to increase, whereby desulfurization of the three-way catalyst 14 is prompted. The predetermined time period THOT is set to such a time period as can promote the desulfurization of the three-way catalyst 14 through increase of the temperature thereof to a sufficient degree.

If it is determined at the step S204 that the predetermined time period THOT has elapsed, the exhaust gas recirculation control is resumed and the ignition timing θIG is returned to normal timing at the step S205, and the determination as to deterioration of the three-way catalyst 14 is executed at the step S206, followed by terminating the program.

Thus, also by the routine of the FIG. 6, the same effects as in the first embodiment can be obtained.

Although in the second embodiment described above, both the interruption of the exhaust gas recirculation and the retardation of the ignition timing θIG are carried out, this is not limitative, but only one of them may be carried out. Further, the enriching of the air-fuel ratio of the mixture supplied to the engine employed in the first embodiment may be carried out in combination with both or one of the above measures for desulfurizing the three-way catalyst through increase of the exhaust gas temperature.

Further, although in the second embodiment, the exhaust gas recirculation is completely interrupted for desulfurization of the three-way catalyst 14, this is not limitative, but the flow rate of exhaust gases recirculated may be decreased over the predetermined time period THOT.

What is claimed is:

1. In an air-fuel ratio control system for an internal combustion engine including an exhaust passage, and a catalyst arranged in said exhaust passage for purifying exhaust gases emitted from said engine, said air-fuel ratio control system including first air-fuel ratio-detecting means arranged at a location upstream of said catalyst for detecting concentration of a particular component of said exhaust gases, and air-fuel ratio control means for controlling an air-fuel ratio of a mixture supplied to said engine in response to an output from said first air-fuel ratio-detecting means, the improvement comprising:

sulfur poisoning-detecting means for detecting deterioration of said catalyst caused by sulfur poisoning; and control parameter-changing means for changing a control parameter for use in controlling an operation of said engine when said deterioration of said catalyst caused by sulfur poisoning is detected.

2. An air-fuel ratio control system according to claim 1, wherein said control parameter is said air-fuel ratio of said mixture supplied to said engine, said control parameter-changing means controlling said air-fuel ratio control means to make said air-fuel ratio of said mixture richer than a stoichiometric air-fuel ratio.

3. An air-fuel ratio control system according to claim 2, wherein said control parameter-changing means controls said air-fuel ratio control means to interrupt air-fuel ratio feedback control responsive to said output from said first air-fuel ratio-detecting means, and make said air-fuel ratio of said mixture supplied to said engine richer than said stoichiometric air-fuel ratio over a predetermined time period, and resume said air-fuel ratio feedback control after lapse of said predetermined time period.

4. An air-fuel ratio control system according to claim 1, wherein said engine includes an intake passage, and exhaust gas-recirculating means for recirculating part of exhaust gases from said exhaust passage to said intake passage, said control parameter being an amount of exhaust gases recirculated by said exhaust gas-recirculating means, said control parameter-changing means controlling said exhaust gas-recirculating means to make said amount of exhaust gases recirculated thereby equal to zero or reduce the same value over a predetermined time period.

5. An air-fuel ratio control system according to claim 4, wherein said control parameter-changing means controls said exhaust gas-recirculating means to restore a normal value of said amount of exhaust gases recirculated thereby after lapse of said predetermined time period.

6. An air-fuel ratio control system according to claim 1, wherein said engine includes ignition timing control means for controlling ignition timing of said engine, said control parameter being said ignition timing controlled by said ignition timing control means, said control parameter-changing means controlling said ignition timing control means to retard said ignition timing over a predetermined time period.

7. An air-fuel ratio control system according to claim 6, wherein said control parameter-changing means controls said ignition timing control means to restore a normal value of said ignition timing after lapse of said predetermined time period.

8. An air-fuel ratio control system according to claim 1, wherein said engine includes an intake passage, and exhaust gas-recirculating means for recirculating part of exhaust gases from said exhaust passage to said intake passage, said control parameter being said air-fuel ratio of said mixture supplied to said engine and an amount of exhaust gases recirculated by said exhaust gas-recirculating means, said control parameter-changing means controlling said air-fuel ratio control means to make said air-fuel ratio of said mixture richer than a stoichiometric air-fuel ratio, and controlling said exhaust gas-recirculating means to make said amount of exhaust gases recirculated thereby equal to zero or reduce the same, over a predetermined time period.

9. An air-fuel ratio control system according to claim 1, wherein said engine includes ignition timing control means for controlling ignition timing of said engine, said control parameter being said air-fuel ratio of said mixture supplied to said engine and said ignition timing controlled by said ignition timing control means, said control parameter-changing means controlling said air-fuel ratio control means to make said air-fuel ratio of said mixture richer than a stoichiometric air-fuel ratio, and controlling said ignition timing control means to retard said ignition timing, over a predetermined time period.

10. An air-fuel ratio control system according to claim 1, wherein said engine includes an intake passage, exhaust gas-recirculating means for recirculating part of exhaust gases from said exhaust passage to said intake passage, and ignition timing control means for controlling ignition timing thereof, said control parameter being an amount of exhaust gases recirculated by said exhaust gas-recirculating means and said ignition timing controlled by said ignition timing control means, said control parameter-changing means controlling said exhaust gas-recirculating means to make said amount of exhaust gases recirculated thereby equal to zero or reduce the same, and controlling said ignition timing control means to retard said ignition timing, over a predetermined time period.

11. An air-fuel ratio control system according to claim 1, wherein said engine includes an intake passage, exhaust gas-recirculating means for recirculating part of exhaust gases from said exhaust passage to said intake passage, and ignition timing control means for controlling ignition timing of said engine, said control parameter being said air-fuel ratio of said mixture supplied to said engine, an amount of exhaust gases recirculated by said exhaust gas-recirculating means, and said ignition timing controlled by said ignition timing control means, said control parameter-changing means controlling said air-fuel ratio control means to make said air-fuel ratio of said mixture richer than a stoichiometric air-fuel ratio, controlling the exhaust gas-recirculating means to make said amount of exhaust gases recirculated thereby equal to zero or reduce the same, and controlling said ignition timing control means to retard said ignition timing, over a predetermined time period.

12. An air-fuel ratio control system according to claim 1, including aging deterioration-detecting means for detecting deterioration of said catalyst caused by aging, and wherein when said poisoning-detecting means detects said deterioration of said catalyst caused by sulfur poisoning, said control parameter-changing means changes said control parameter over a predetermined time period to desulfurize said catalyst, and permits said aging deterioration-detecting means to detect said deterioration of said catalyst caused by aging after lapse of said deterioration time period.

13. An air-fuel ratio control system according to claim 1, inducing a second air-fuel ratio-detecting means arranged at a location downstream of said catalyst, and wherein said poisoning-detecting means determines that said catalyst is poisoned by sulfur when a rich-side maximum value of an output form said second air-fuel ratio control means is below a predetermined value.

* * * * *